United States Patent
Sasaki et al.

(10) Patent No.: US 9,429,690 B2
(45) Date of Patent: Aug. 30, 2016

(54) DIFFUSION SHEET, BACKLIGHT, LIQUID CRYSTAL DISPLAY APPARATUS, AND METHOD OF PRODUCING A DIFFUSION SHEET

(75) Inventors: Jun Sasaki, Miyagi (JP); Akihiro Horii, Miyagi (JP)

(73) Assignee: Sony Corporation, Tokyo (JP)

(*) Notice: Subject to any disclaimer, the term of this patent is extended or adjusted under 35 U.S.C. 154(b) by 79 days.

(21) Appl. No.: 13/552,816

(22) Filed: Jul. 19, 2012

(65) Prior Publication Data
US 2013/0121018 A1  May 16, 2013

(30) Foreign Application Priority Data
Aug. 8, 2011 (JP) .................. 2011-172722

(51) Int. Cl.
*F21V 7/04* (2006.01)
*G02B 5/02* (2006.01)

(52) U.S. Cl.
CPC .............. *G02B 5/0221* (2013.01); *G02B 5/02* (2013.01); *G02B 5/0231* (2013.01); *G02B 5/0268* (2013.01)

(58) Field of Classification Search
CPC ............... G02F 1/133615; G02F 1/133606; G02B 6/0038

USPC .......... 362/600–630, 97.1–97.4, 561; 349/62
See application file for complete search history.

(56) References Cited

U.S. PATENT DOCUMENTS

| | | | |
|---|---|---|---|
| 2010/0110331 A1* | 5/2010 | Han et al. | 349/62 |
| 2010/0315803 A1* | 12/2010 | Inoue | G02B 5/0278 362/97.1 |
| 2011/0116014 A1* | 5/2011 | Lee et al. | 349/64 |
| 2011/0164321 A1* | 7/2011 | Lee et al. | 359/599 |

FOREIGN PATENT DOCUMENTS

| | | |
|---|---|---|
| JP | 2002-189106 A | 7/2002 |
| JP | 2006-318668 A | 11/2006 |
| JP | 2008-218321 A | 9/2008 |
| JP | 2009-223192 A | 10/2009 |
| JP | 2010-79248 A | 4/2010 |
| JP | 2011-018014 A | 1/2011 |
| JP | 2011-133555 A | 7/2011 |

* cited by examiner

*Primary Examiner* — Anh Mai
*Assistant Examiner* — Jessica M Apenteng
(74) *Attorney, Agent, or Firm* — Chip Law Group

(57) ABSTRACT

A diffusion sheet includes a light-transmissive substrate, a plurality of structures, and a flat portion. The light-transmissive substrate includes a first main surface, and a second main surface. The plurality of structures have convex shapes and are randomly formed on the first main surface. The flat portion is formed among the plurality of structures on the first main surface and has a surface roughness (Ra) of no less than 0.9 μm.

6 Claims, 13 Drawing Sheets

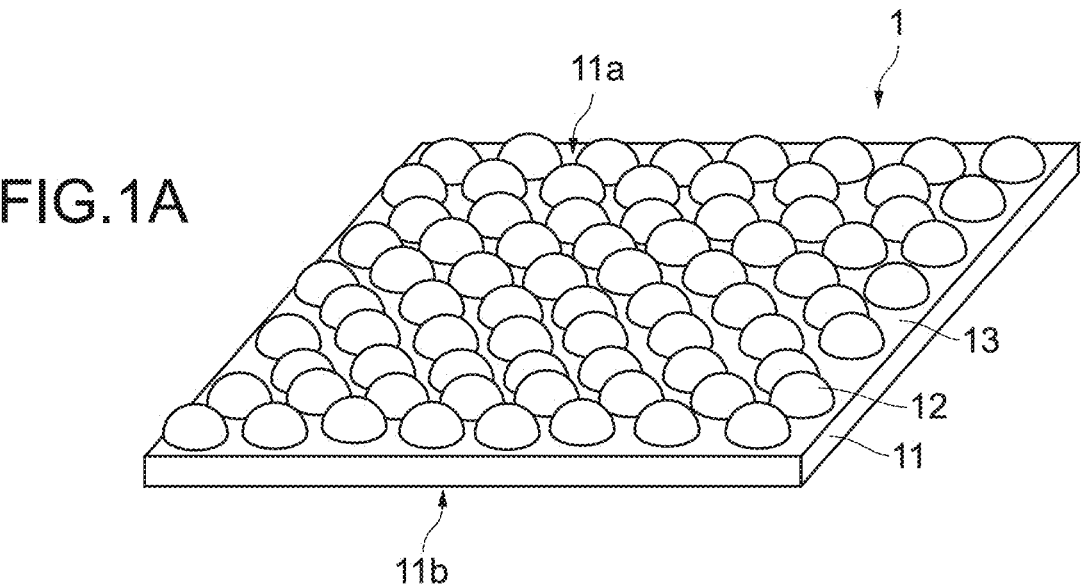
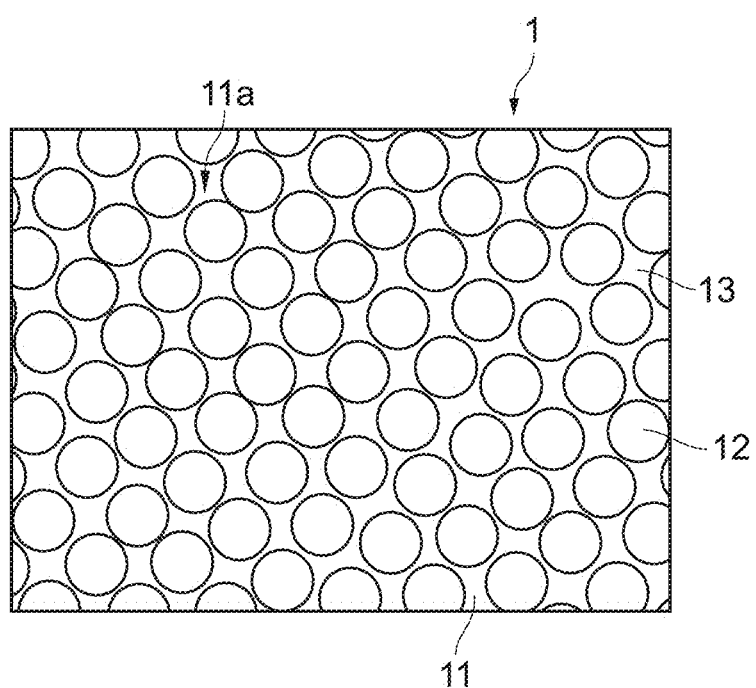

DIFFUSION SHEET, BACKLIGHT, LIQUID CRYSTAL DISPLAY APPARATUS, AND METHOD OF PRODUCING A DIFFUSION SHEET

BACKGROUND

The present disclosure relates to a diffusion sheet having a surface on which convex-shaped structures are formed and a method of producing the same, and to a backlight and a liquid crystal display apparatus each including such a diffusion sheet.

In related art, for a backlight to be incorporated into a liquid crystal display apparatus, there have been used various optical sheets. As one of the most important sheets among the various optical sheets, there is a diffusion sheet. As the diffusion sheet, a sheet obtained by forming a convex-shaped micro-lens group on a main surface of a transparent sheet substrate is known (e.g., see Japanese Patent Application Laid-open No. 2006-318668).

SUMMARY

Due to development of thinned liquid crystal display apparatuses in recent years, it is desirable to further reduce the thickness of the diffusion sheet. The diffusion sheet is provided between a light source and a crystal liquid panel and diffuses light emitted from the light source, and hence the diffusion sheet has a function of eliminating unevenness in luminance or luminescent spot. Specifically, as the diffusion sheet has a higher haze, the light diffusion function is enhanced.

In view of the above-mentioned circumstances, there is a need for providing a diffusion sheet capable of enhancing a light diffusion function, a backlight and a liquid crystal display apparatus each including the same, and a method of producing a diffusion sheet.

According to an embodiment of the present disclosure, there is provided a diffusion sheet including a light-transmissive substrate, a plurality of structures, and a flat portion.

The light-transmissive substrate includes a first main surface, and a second main surface.

The plurality of structures have convex shapes and are randomly formed on the first main surface.

The flat portion is formed among the plurality of structures on the first main surface and has a surface roughness (Ra) of no less than 0.9 µm.

In the diffusion sheet, the structures have a function of diffusing light transmitting through the substrate and a light collection function. The structures are randomly formed on the first main surface, and hence the generation of moire is suppressed. Further, the flat portion formed among the structures on the first main surface has a surface roughness (Ra: arithmetic average surface roughness) of no less than 0.9 µm, and hence it is possible to obtain a high light diffusion effect. Therefore, according to the diffusion sheet described above, it is possible to significantly enhance the light diffusion function.

The second main surface may have a surface roughness (Ra) of no more than 0.5 µm. With this configuration, it is possible to increase the haze of the diffusion sheet. Further, it is possible to prevent damages because the second main surface has a lower frictional force.

According to an embodiment of the present disclosure, there is provided a backlight including a diffusion sheet and a light source.

The diffusion sheet includes a light-transmissive substrate, a plurality of structures, and a flat portion. The light-transmissive substrate includes a first main surface, and a second main surface. The plurality of structures have convex shapes and are randomly formed on the first main surface. The flat portion is formed among the plurality of structures on the first main surface and has a surface roughness (Ra) of no less than 0.9 µm.

The light source is provided on a side of the second main surface.

According to an embodiment of the present disclosure, there is provided a liquid crystal display apparatus including a diffusion sheet, a light source, and a liquid crystal panel.

The diffusion sheet includes a light-transmissive substrate, a plurality of structures, and a flat portion. The light-transmissive substrate includes a first main surface, and a second main surface. The plurality of structures have convex shapes and are randomly formed on the first main surface. The flat portion is formed among the plurality of structures on the first main surface and has a surface roughness (Ra) of no less than 0.9 µm.

The light source is provided on a side of the second main surface.

The liquid crystal panel is provided on a side of the first main surface.

In each of the backlight and the liquid crystal display apparatus, the diffusion sheet has a light diffusion function and a light collection function. The structures are randomly formed on the first main surface, and hence the generation of moire is suppressed. Further, the flat portion formed among the structures on the first main surface has a surface roughness (Ra: arithmetic average surface roughness) of no less than 0.9 µm), and hence it has a light diffusion function. With this configuration, it is possible to enhance the light diffusion function.

According to an embodiment of the present disclosure, there is provided a method of producing a diffusion sheet, which includes forming random exposure patterns in a resist layer formed on a surface of a substrate for producing a master.

By developing the resist layer in which the random exposure patterns are formed, random pattern openings are formed in the resist layer.

By etching the substrate for producing a master using the resist layer in which the openings are formed as a mask, a master including concave portions formed correspondingly to the openings and a flat portion covered with the resist layer is produced.

The flat portion is roughened to have a surface roughness (Ra) of no less than 0.9 µm.

By transferring shapes of the concave portions and the roughened flat portion of the master to a main surface of a light-transmissive substrate, a diffusion sheet including a plurality of convex-shaped structures and a roughened flat portion among the plurality of structures is produced.

According to the method of producing a diffusion sheet, the diffusion sheet having the main surface on which structures having a light diffusion function and a light collection function and a flat portion having a light diffusion function are formed is produced. With this configuration, it is possible to enhance the light diffusion function.

In the roughening the flat portion of the master, blast processing in which blasting particles are spayed onto the flat portion may be used. Alternatively, by other surface processing method such as a laser machining or wire brushing, or grinding processing of the master surface, the flat portion of the master may be roughened.

In the blast processing, by blasting particles each having a particle diameter larger than an opening diameter of each of the concave portions are used, inner surfaces of the concave portions are prevented from being roughened. With this configuration, the surfaces of the structures of the diffusion sheet are kept smooth, and it is possible to suppress the decrease of the front luminance.

As described above, according to the embodiments of the present disclosure, it is possible to provide a diffusion sheet capable of enhancing a light diffusion function. By incorporating such a diffusion sheet into a backlight or a liquid crystal display apparatus, it is also possible to provide the backlight and the liquid crystal display apparatus each having reduced luminance unevenness.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 1A is a schematic perspective view of main parts of a diffusion sheet according to an embodiment of the present disclosure and FIG. 1B is a schematic plan view of the main parts;

FIG. 4 are schematic views showing a configuration example of a molding apparatus that produces the diffusion sheet according to the embodiment of the present disclosure, in which

FIG. 5 are schematic configuration views of a liquid crystal display apparatus according to an embodiment of the present disclosure, in which

DETAILED DESCRIPTION OF EMBODIMENTS

Figure 2A:
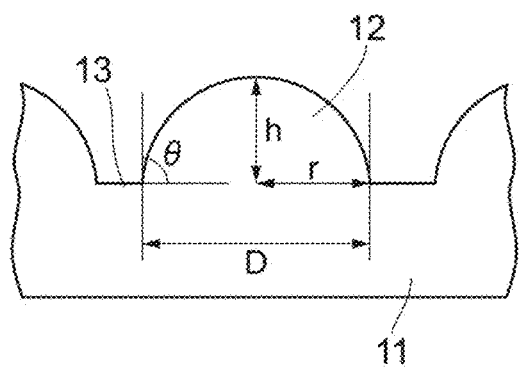
FIG. 2A is a schematic cross-sectional view of one of structures formed on a main surface of the diffusion sheet and FIG. 2B is a cross-sectional view showing a modified example of the structure.

Hereinafter, embodiments of the present disclosure will be described with reference to the drawings.

First Embodiment

[Configuration of Diffusion Sheet]

FIG. 1A is a schematic perspective view of main parts of a diffusion sheet according to an embodiment of the present disclosure and FIG. 1B is a schematic plan view of the main parts. A diffusion sheet 1 according to this embodiment includes a substrate 11, convex-shaped structures 12, and a flat portion 13. The substrate 11 includes a main surface 11a (first main surface) and a main surface 11b (second main surface). The convex-shaped structures 12 are formed on the one main surface 11a of the substrate 11. The flat portion 13 is formed among the structures 12 on the main surface 11a.

The main surface 11b on a back surface side of the diffusion sheet 1 serves as a light incident surface. The main surface 11a on a front surface side of the diffusion sheet 1 serves as a light emitting surface. Both the main surfaces 11a and 11b of the diffusion sheet 1 are exposed to the air. The main surface 11a has optical functions such as a light diffusion function and a light collection function using a difference in refractive index at an interface with the air layer. In particular, the structures 12 have a light diffusion function and a light collection function and the flat portion 13 has a light diffusion function.

As the substrate 11, a sheet or film having a transparency may be used, for example. As a material for the substrate 11, for example, a well-known polymer material may be used. The examples of the well-known polymer material include triacetyl cellulose (TAC), polyester (TPEE), polyethylene terephthalate (PET), polyimide (PI), polyamide (PA), aramid, polyethylene (PE), polyacrylate, polyether sulfone, polysulfone, polypropylene (PP), diacetyl cellulose, polyvinyl chloride, acrylic resin (PMMA), polycarbonate (PC), epoxy resin, urea formaldehyde resin, urethane resin, and melamine resin. The substrate 11 may include, if necessary, a filler, a plasticizer, a stabilizer, an anti-degradation agent, a dispersant, a flame retardant, an ultraviolet absorber, and the like. The thickness of the substrate 11 is not particularly limited. From the perspective of productivity, for example, the thickness of the substrate 11 is 25 μm to 300 μm.

On the main surface 11a of the substrate 11, the plurality of convex-shaped structures 12 are formed randomly (irregularly). The structures 12 are formed integrally with the main surface 11a of the substrate 11. Thus, the diffusion sheet 1 has a single-layer structure formed of a single thermoplastic resin material. By adopting such a structure, unlike a diffusion sheet having a multi-layer structure, no interface reflections occur, and hence it is possible to increase the luminance. Further, the resin for the diffusion sheet 1 may be re-used.

(Structure)

The structures 12 formed on the main surface 11a of the substrate 11 have an identical or almost identical shape. In this embodiment, each of the structures 12 has a partially spherical shape. The partially spherical shape means a shape obtained by cutting out a part of a spherical body. For the partially spherical shape, smaller one than a semi-spherical body is favorable considering a mold release property of the structures in a production process to be described later. Further, the partially spherical shape includes an almost partially spherical shape. Here, the almost partially spherical shape means a shape obtained by slightly distorting the partially spherical shape within such a range that optical properties such as the luminance is not significantly lowered in comparison with the case where the partially spherical shape is used.

FIG. 2A is a view for describing the shape of each of the structures 12. The size of the structure 12 may be selected depending on a method of transferring the shape of the structure 12. In the case where a melt extrusion molding method is used as the shape transfer method, an average diameter D of a circular bottom surface of the structure 12 is, for example, no less than 50 μm and no more than 100 μm. If the average diameter D is less than 50 μm, a transfer property tends to be lowered. On the other hand, if the average diameter D is more than 100 μm, a visibility tends to be lowered when the diffusion sheet 1 is implemented in a liquid crystal display apparatus. In the case where a laminate transfer molding method is used as the shape transfer method, the average diameter D of the circular bottom surface of the structure 12 is, for example, no less than 20 μm and no more than 50 μm. If the average diameter D is less than 20 μm, the produce of a master tends to become difficult. If the average diameter D is more than 50 μm, the productivity tends to be lowered. Here, the melt extrusion molding method means a method in which a heated and molten resin is extruded into a sheet shape and the concavo-convex shape of a master roll is transferred thereto. Further, the laminate transfer molding method means a method in which the concavo-convex shape of an embossed belt is transferred to a sheet by thermal transfer. It should be noted that molding apparatuses adopting those molding methods will be described later in detail.

An aspect ratio h/r of the structure 12 (r: average radius of structure, h: average height of structure) is more than 0.85 and no more than 1.50, favorably, no less than 0.95 and no more than 1.10. If the aspect ratio h/r is no more than 0.85, the luminance tends to be lowered in the case where one or more diffusion sheets 1 are used in the backlight. On the other hand, if the aspect ratio h/r is more than 1.50, the transfer property tends to be lowered. In the case where a plurality of diffusion sheets 1 are used in the backlight, it is favorable that a diffusion sheet 1 of the plurality of diffusion sheets, which is located furthest away from the light source, have the highest aspect ratio. That is because a change in the aspect ratio of the diffusion sheet located furthest away from the light source is the most influential on the luminance of the backlight.

It should be noted that in the case where a plurality of optical sheets including at least one diffusion sheet 1 are used in the backlight, the aspect ratio h/r of the structure 12 is more than 0.50 and no more than 1.50, favorably, no less than 0.55 and no more than 1.10. If the aspect ratio h/r is no more than 0.50, the luminance tends to be lowered when the plurality of optical sheets are used in the backlight. On the other hand, if the aspect ratio is more than 1.50, the transfer property tends to be lowered. In the case where a plurality of optical sheets including a plurality of diffusion sheets 1 are used in the backlight, it is favorable that a diffusion sheet of the plurality of diffusion sheets, which is located furthest away from the light source, have the highest aspect ratio. That is because a change in the aspect ratio of the diffusion sheet located furthest away from the light source is the most influential on the luminance of the backlight.

A side-surface angle $\theta$ of the structure 12 near the boundary with the main surface 11a of the substrate 11 is favorably no less than 65° and no more than 90°. If the side-surface angle $\theta$ is less than 65°, the luminance tends to be significantly lowered. In order to increase the luminance, it is favorable to set the side-surface angle $\theta$ to about 70°±2°. On the other hand, if the side-surface angle $\theta$ is more than 90°, the release of the structure 12 from the mold tends to become difficult. Here, the "side-surface angle of the structure 12 near the boundary with the main surface 11a of the substrate 11" means an angle that is formed, when the structure 12 is cut along its center line, near an intersection point of the outline of the cut surface of the structure 12 and the outline of the flat portion 13, by a tangent line of the outline of the structure 12 and the outline of the flat portion.

Figure 2B:
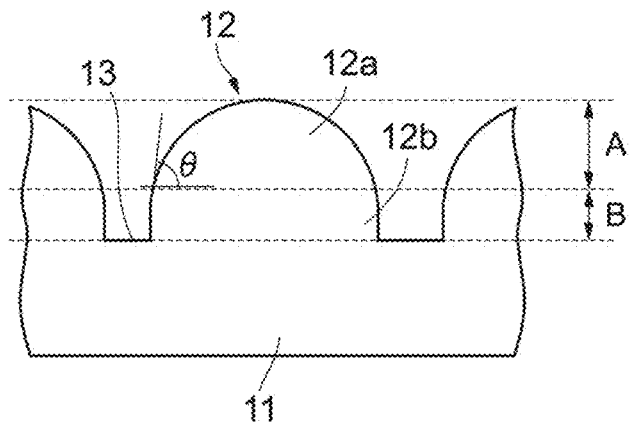

FIG. 2B is a view showing another configuration example of the structure 12. As shown in FIG. 2B, the structure 12 may include a main body portion 12a and a base portion 12b. The main body portion 12a has a lens function. The base portion 12b extends from the bottom surface of the main body portion 12a to the substrate 11. The structure 12 includes the base portion 12b in this manner, and hence even if the structure 12 has a non-uniform height, the main body portion 12a of the structure 12 is allowed to have a semi-spherical shape or a shape that is more similar to the semi-spherical shape. Thus, as described above, it is possible to set the side-surface angle of the structure 12 near the boundary with the main surface 11a of the substrate 11 to within an angle range of no less than 65° and no more than 90°. Therefore, it is possible to increase the luminance of the diffusion sheet 1. As the shape of the main body portion 12a, the partially spherical shape is favorable. Here, the main body portion 12a means a section A such that, when the structures 12 and the flat portion among the structures are viewed from an in-plane direction of the diffusion sheet 1, an angle formed by a tangent line of the outline of each of the structures 12 and the outline of the flat portion 13 among the structures falls within a range of no less than 0° and no more than 85°. Further, the base portion 12b means a section B such that, when the structures 12 and the flat portion 13 among the structures are viewed from the in-plane direction of the diffusion sheet 1, the angle formed by the tangent line of the outline of each of the structures 12 and the outline of the flat portion 13 among the structures falls within a range of no less than 85° and no more than 90°.

An average length l of the base portion 12b (height of the section B from the main surface 11a of the substrate 11) is, for example, 0<l≤20 μm. By setting the average length l of the base portion 12b to 0<L, even if the structure 12 has a non-uniform height, the main body portion 12a of the structure 12 is allowed to have a semi-spherical shape or a shape that is more similar to the semi-spherical shape. By setting the average length l of the base portion 12b to l≤20 μm, it is possible to suppress the lowering of the transfer property.

A filling rate of the structures 12 in the main surface 11a of the substrate 11 is, for example, no less than 60% and no more than 80%. If the filling rate is less than 55%, the luminance tends to be lowered. On the other hand, if the filling rate is more than 80%, moire tends to be generated. Here, the moire includes moire generated when a plurality of diffusion sheets 1 are laminated on each other, moire with panel pixels that is generated when the diffusion sheet 1 is combined and used with a liquid crystal panel, and moire due to diffusion plate pitches that is generated when the diffusion sheet 1 is combined and used with a diffusion plate.

The structures 12 have an identical or almost identical height. A non-uniformity (K) in height of the structures 12 satisfies, for example, a relationship of 0<K≤10%, favorably, 0<K≤8%. Setting the non-uniformity (K) in height of the structures 12 to within such a range can contribute to increase the luminance of the diffusion sheet 1.

(Flat Portion)

The flat portion 13 is formed among the individual structures 12 on the main surface 11a of the substrate 11. The flat portion 13 is formed on the same plane as the bottom surface of each of the structures 12 to surround the individual structures 12.

By appropriately roughening the surface of the flat portion 13, it is possible to provide the flat portion 13 with a function of diffusing light transmitting through the flat portion 13. Specifically, as the surface roughness of the flat portion 13 becomes higher, a higher haze value is obtained. On the other hand, as the haze value becomes higher, the luminance in a front direction tends to be lowered. The haze value of the diffusion sheet 1 also depends on occupancy of the flat portion 13 in the main surface 11a of the diffusion sheet 1, that is, the filling rate of the structures 12, and hence the surface roughness of the flat portion 13 may be determined appropriately in accordance with the filling rate of the structures 12.

As described above, in the case where the filling rate of the structures 12 is 60% to 80%, the surface roughness of the flat portion 13 is, for example, an arithmetic average surface roughness (Ra) of no less than 0.9 μm. By defining the surface roughness of the flat portion 13 to such a value, it becomes possible to suppress a significant decrease in the luminance and to adjust the flat portion 13 to have a suitable haze. Specifically, by roughening the flat portion 13 to have a surface roughness (Ra) of no less than 0.9 μm, in comparison with the case where the flat portion is not roughened, it is possible to keep a front luminance-decreasing rate below 7% and to increase the haze by 20% or more.

A method of forming the flat portion 13 having the surface roughness (Ra) described above is not particularly limited. In this embodiment, a molding apparatus is used to produce the diffusion sheet 1 as will be described later. In this case, the main surface 11a of the diffusion sheet 1 is formed by transferring the shape of the master used in the molding apparatus. Thus, by roughening the flat portion of the master corresponding to the flat portion 13 to have the surface roughness within the above-mentioned range, the flat portion 13 is formed at the same time as the structures 12 are formed.

It should be noted that the roughening of the flat portion 13 is not limited to evenly roughening the surface of the flat portion 13 and also includes locally roughening the surface of the flat portion 13. A specific roughening process includes forming minute concavities and convexities in the surface of the flat portion 13 and generating minute cracks therein. Further, if the roughness degree of the flat portion 13 is directional, it is sufficient that the roughness degree in at least one direction is no less than 0.9 μm.

(Other)

The main surface 11b on the back surface side of the substrate 11 is formed to be flat. In this case, although the main surface 11b is a smooth surface, if the main surface 11b is appropriately roughened, it is possible to suppress damages of the main surface 11b due to friction and reduce external appearance defects. Further, by roughening the main surface 11b, the light diffusion function of the main surface 11b is enhanced. Therefore, the haze value of the single diffusion sheet 1 increases, which can contribute to reduce luminance unevenness.

Figure 6:
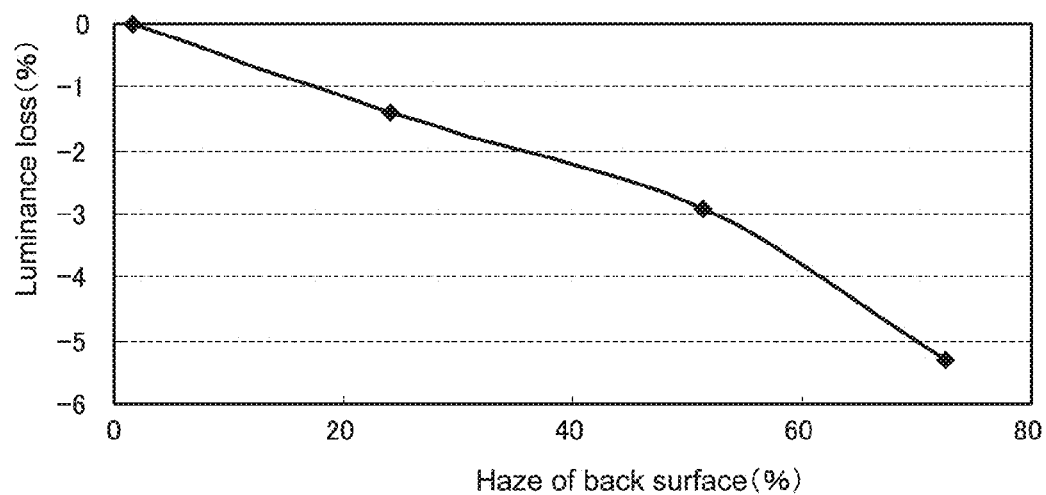
FIG. 6 is an experiment result showing a relationship between a haze of a back surface of the diffusion sheet according to the embodiment of the present disclosure and a luminance loss in a front direction.

On the other hand, by the amount of increase of the haze of the main surface 11b, the front luminance tends to be lowered. FIG. 6 is an experiment result showing an example thereof. As can be seen in FIG. 6, depending on the increase of the haze of the back surface of the diffusion sheet, the loss rate of the front luminance increases. Therefore, the surface roughness of the main surface 11b may be set depending on a desired haze value of the diffusion sheet 1 and a desired front luminance property. Further, the surface roughness of the main surface 11b is set also considering the haze value on the side of the main surface 11a, particularly, the surface roughness of the flat portion 13, the filling rate of the structures 12, and the like. In the case where the filling rate of the structures 12 is no less than 60% and no more than 80% and the surface roughness (Ra) of the flat portion 13 is no less than 0.9 μm, the surface roughness (Ra) of the main surface 11b is, for example, no more than 0.5 μm.

[Method of Producing Diffusion Sheet]

Next, with reference to FIGS. 3A to 3F, an example of a method of producing the diffusion sheet 1 will be described.

(Resist Layer Formation Process)

Figure 3A:
FIGS. 3A to 3G are schematic cross-sectional views of processes for describing a method of producing the diffusion sheet according to the embodiment of the present disclosure.

First, on a surface of a substrate for producing a master 21 that is a processed target, a resist layer 22 is formed (see FIG. 3A). The substrate for producing the master 21 that is the processed target is made of, for example, metal material. The surface of the substrate for producing the master 21 may be subjected to plating processing such as copper plating in advance. The examples of the shape of the substrate for producing the master 21 that is the processed target include a plate shape, a sheet shape, a film shape, a block shape, a circular cylindrical shape, a circular tube shape, and a circular ring shape. As the material for the resist layer 22, for example, an inorganic resist or an organic resist may be used. It should be noted that if the substrate for producing the master 21 has the circular cylindrical shape or the circular tube shape, the resist layer 22 is formed on the outer peripheral surface thereof.

(Exposure Process)

Figure 3B:
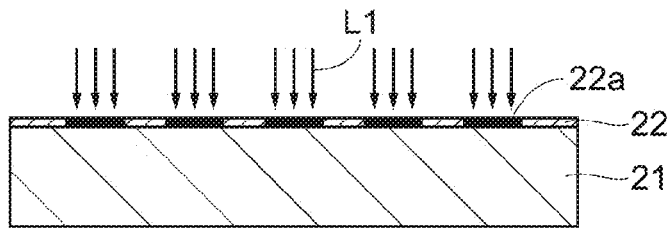

Next, for example, by irradiating the resist layer 22 with light L1 such as laser light, light-exposed portions 22a are randomly formed (see FIG. 3B). The examples of the shape of the light-exposed portions 22a to be formed in the resist layer 22 include a circular or almost circular shape. In the case where the light-exposed portions each having such a shape are formed, the size of the light-exposed portions 22a is selected depending on the transfer method used in the shape transfer process to be described later. For example, in the case where the melt extrusion molding method is used as the transfer method, the average diameter D of the bottom surface of each of the light-exposed portions is, for example, no less than 50 μm and no more than 100 μm. In the case where the laminate transfer molding method is used as the transfer method, the average diameter D of the bottom surface of each of the light-exposed portions is, for example, no less than 20 μm and no more than 50 μm.

(Development Process)

Figure 3C:
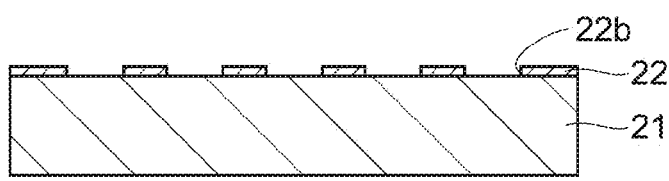
Figure 3D:
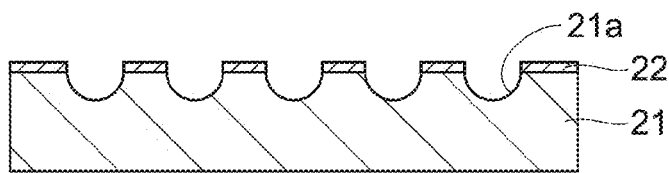

Next, the resist layer 22 in which the light-exposed portions 22a have been formed is developed. Accordingly, openings 22b corresponding to the light-exposed portions 22a are formed in the resist layer 22 (see FIG. 3C). It should be noted that although FIG. 3C shows the example in which a positive type resist is used as the resist and the openings 22b are formed in the light-exposed portions, the resist is not limited to this example. Thus, a negative type resist may be used as the resist and the light-exposed portions may remain.

(Etching Process)

Next, using the resist layer 22 in which the openings 22b have been formed as a mask, the surface of the substrate for producing the master 21 is etched. Accordingly, concave portions 21a having an identical or almost identical depth are formed in the surface of the substrate for producing the master 21 (see FIG. 3D). Although as the etching, for example, both of dry etching and wet etching may be used, wet etching is favorably used for easy installation. Further, as the etching, for example, both of isotropic etching and anisotropic etching may be used and may be selected appropriately in accordance with a desired shape of the structures 12.

(Resist Separation Process)

Figure 3E:
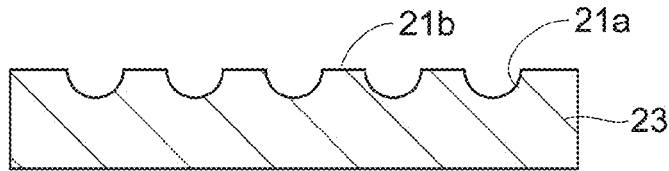

Next, by ashing or the like, the resist layer 22 formed on the surface of the substrate for producing the master is separated therefrom (see FIG. 3E). Accordingly, a master 23 having a concavo-convex-shaped surface including the concave portions 21a having inverted shapes of the structures 12 and a flat portion 21b covered with the resist layer 22 is obtained.

(Plating Process)

Next, as necessary, the concavo-convex-shaped surface of the master 23 is subjected to plating processing to form a plating layer, for example, nickel plating, nickel-phosphorus plating, or chromium-nickel plating. In this embodiment, the concavo-convex-shaped surface of the master 23 is chromium-plated.

(Roughening Process)

Figure 3F:
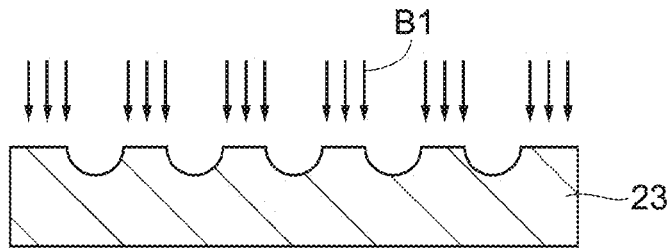

Next, the flat portion 21b of the master 23 is roughened. In this embodiment, by subjecting the flat portion 21b of the master 23 to blast processing, the flat portion 21b is roughened (see FIG. 3F). Specifically, as shown in FIG. 3F, by spraying the master 23 with the blasting particles B1 at high speed, the surface of the flat portion 21b is roughened. Although glass particles are used for the blasting particles, the particles are not limited thereto and metal particles, resin particles, etc. may be used.

Further, due to the spraying of the blasting particles, in some cases, minute cracks are generated in the chromium plating covering the flat portion 21b of the master 23. The cracks generated in the chromium plating exert a function of increasing the surface roughness of the flat portion 21b along with the deformation action of the surface due to collision with the blasting particles.

On the other hand, in order to prevent the inner surfaces of the concave portions 21a from being roughened, the blasting particles each having a particle diameter larger than a diameter (opening diameter) of each of the concave portions 21a are used. Accordingly, as will be described later, smoothness of the surfaces of the structures 12 of the diffusion sheet 1 produced using the master 23 is maintained. Therefore, it is possible to suppress a significant decrease in the front luminance.

Figure 7:
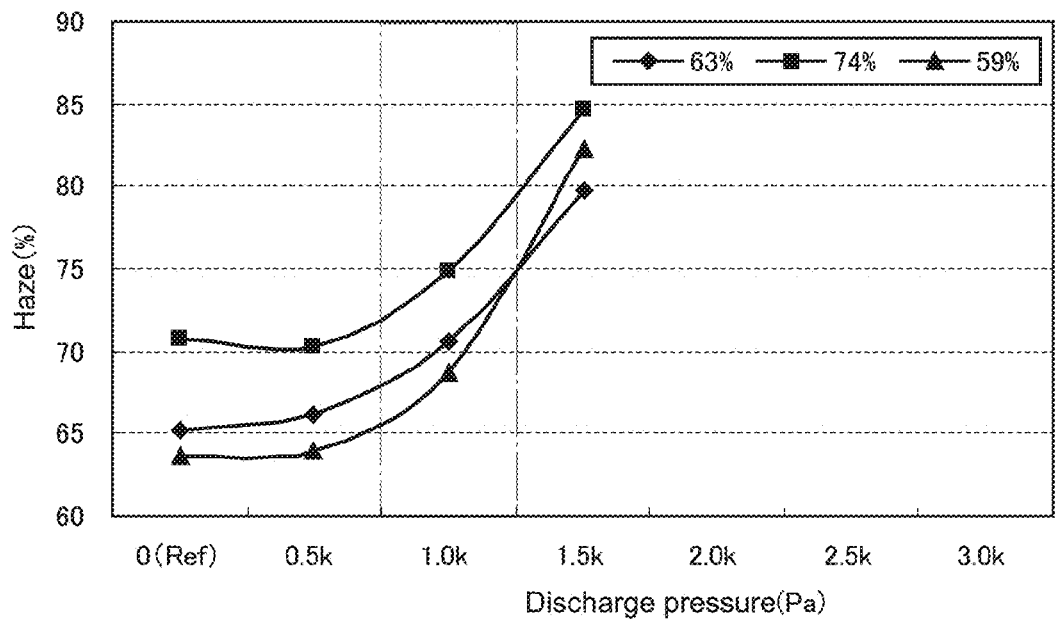
FIG. 7 is an experiment result showing a relationship between a discharge pressure of blasting particles and a haze of a diffusion sheet produced using a master for producing the diffusion sheet according to the embodiment of the present disclosure in blast processing on the master.

Blast processing conditions are set considering, for example, the filling rate of the structures 12 constituting the main surface 11a because the blast processing conditions influence the haze value and the front luminance of the main surface 11a of the diffusion sheet 1 the shape of which has been transferred using the master 23. For example, FIG. 7 is an experiment result showing a relationship between a discharge pressure of the blasting particles (spray pressure to the master) and a haze value of the main surface 11b of the diffusion sheet the shape of which has been transferred using the master 23. Further, FIG. 8 is an experiment result showing a relationship between a discharge pressure of blasting particles B1 to the master 23 and front luminance of the main surface 11b of the diffusion sheet the shape of which has been transferred using the master 23.

As measurement samples, three samples of 59% (Sample 1), 63% (Sample 2), and 74% (Sample 3) of the filling rate of the structures 12 are used. Here, glass beads each having a particle diameter of 75 to 90 μm were used as the blasting particles and a distance between a discharge nozzle of the blasting particles and the flat portion 21b of the master 23 was set to 20 cm. The discharge pressure of the blasting particles was set to a spray pressure of the air. As the master 23, a master having a chromium-plated outer peripheral surface and a circular tube shape was used. This master was sprayed with the blasting particles while the master is rotated around an axis at 50 revolutions per minute (rpm). Three kinds of masters were prepared for Samples 1 to 3. The diameter of the concave portion of the master for producing Sample 1 was set to 68 μm, the diameter of the concave portion of the master for producing Sample 2 was set to 70 μm, and the diameter of the concave portion of the master for producing Sample 3 was set to 76 μm.

Figure 8:
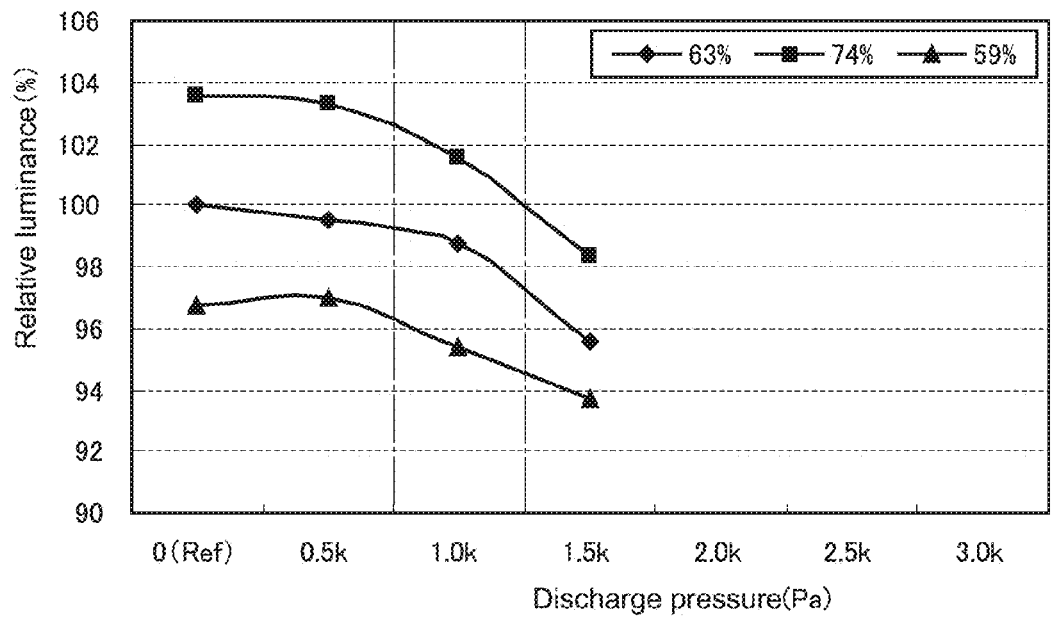
FIG. 8 is an experiment result showing a relationship between the discharge pressure of the blasting particles and a front luminance of the diffusion sheet produced using the master for producing the diffusion sheet according to the embodiment of the present disclosure in the blast processing on the master.

As can be seen in FIGS. 7 and 8, along with an increase in the discharge pressure of the blasting particles, the haze value tends to increase while the front luminance tends to be lowered. In FIG. 8, the front luminance was represented by "relative luminance" with the front luminance of Sample 2 being a reference. Regarding all the samples, when the discharge pressure exceeds 1 kPa, a sharp decrease in luminance and an increase in haze are seen. The decrease in the luminance is considered to be caused by the deformation of edge portions of the concave portions 21a due to the collision action of the blasting particles. As can be seen in FIGS. 7 and 8, within a range of approximately 0.7 to 1.3 kPa of the discharge pressure of the blasting particles, it is possible to keep the luminance-decreasing rate below 4% and, at the same time, to increase the haze for all the samples.

Figure 9:
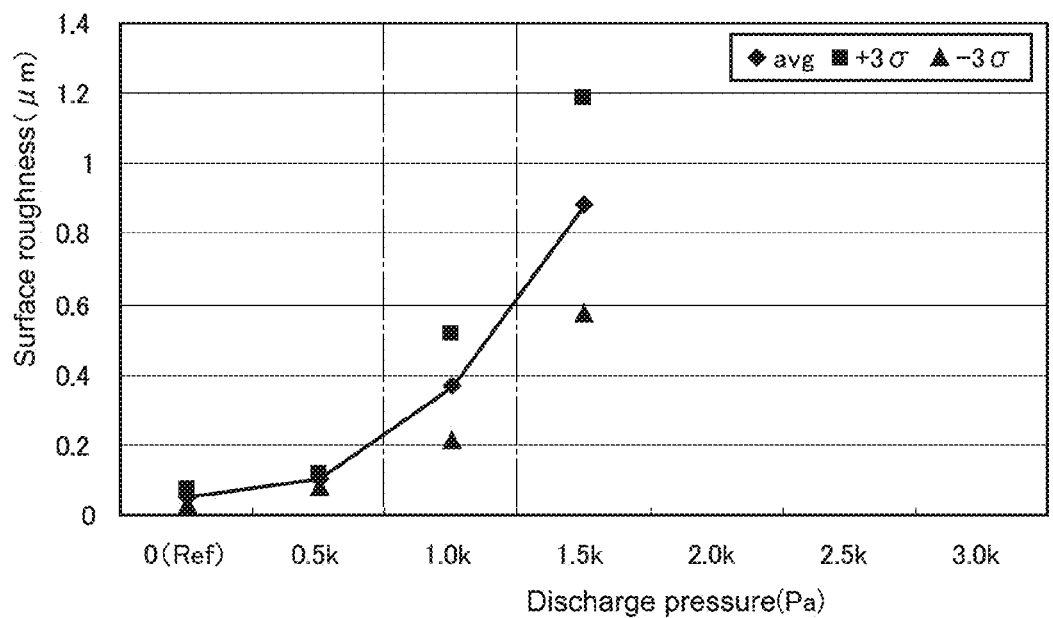
FIG. 9 is an experiment result showing a relationship between a discharge pressure of the blasting particles and a surface roughness (Ra) of the master for producing the diffusion sheet according to the embodiment of the present disclosure in the blast processing on the master.

The surface roughness (Ra) of the flat portion 21b varies depending on the spray pressure (discharge pressure) of the blasting particles to the flat portion 21b, the particle diameter of each of the blasting particles, the kind of the blasting particles, and the like. Therefore, in order to obtain a desired surface roughness, these processing conditions should be considered. For example, FIG. 9 is an experiment result showing a relationship between a discharge pressure of the blasting particles B1 to the master 23 and a surface roughness (Ra) of the flat portion 13 on the main surface 11b of the diffusion sheet the shape of which has been transferred using the master 23. As the master 23, the masters for producing Samples 1 to 3 described above were used. In FIG. 9, average values of the surface roughness of the flat portions of the respective masters and deviations (+3σ, −3σ) thereof were plotted.

As shown in FIG. 9, as the discharge pressure of the blasting particles becomes higher, the surface roughness (Ra) of the flat portion 21b increases. As in the above-mentioned example, within such a range that the discharge pressure of the blasting particles is about 1.5 kPa, it is possible to obtain a surface roughness (Ra) of no less than 0.9 μm.

Further, by changing the particle diameter of each of the blasting particles, a desired surface roughness may be obtained. For example, in the case where glass beads each having a particle diameter of 106 to 125 μm are used, at a discharge pressure of about 1 kPa, the flat portion of the master can be provided with a surface roughness (Ra) of no less than 0.9 μm.

Figure 10:
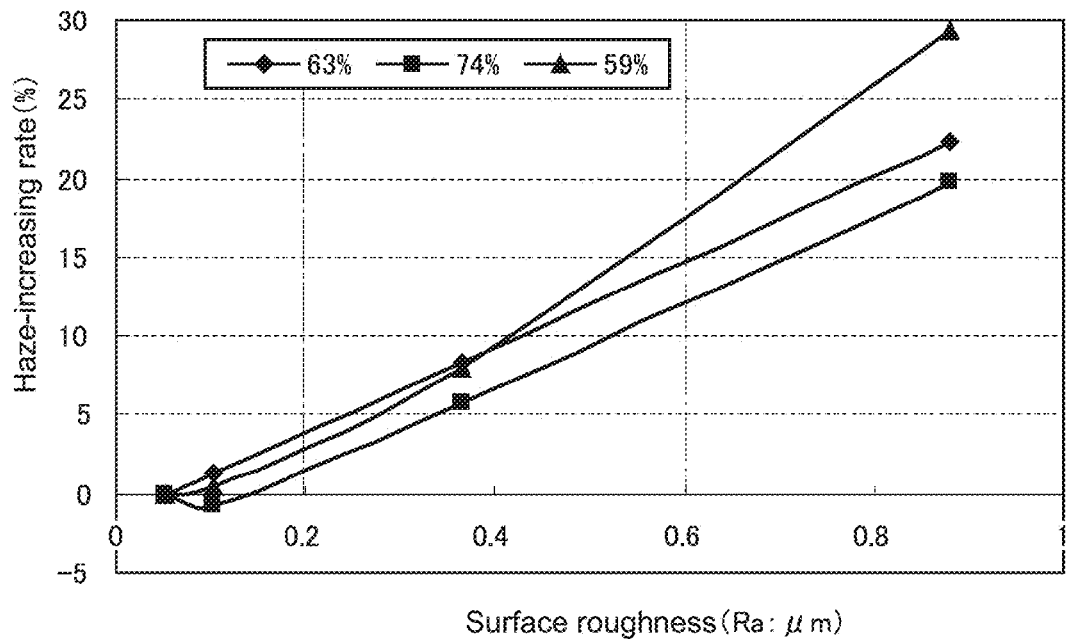
FIG. 10 is an experiment result showing a relationship between a surface roughness of a flat portion in the diffusion sheet according to the embodiment of the present disclosure and a haze-increasing rate.
Figure 11:
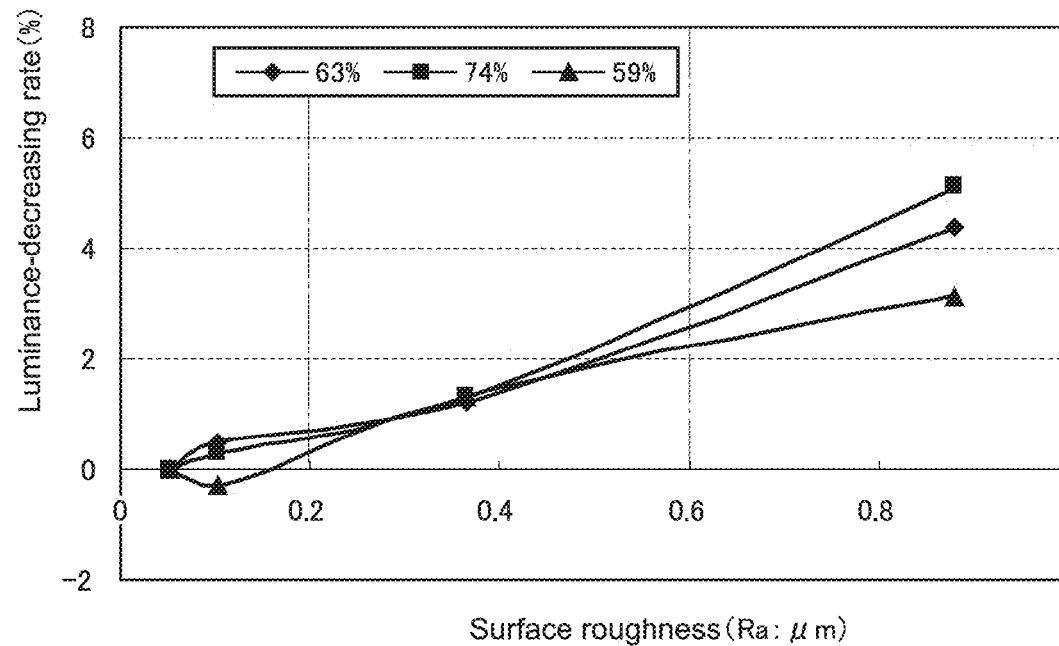
FIG. 11 is an experiment result showing the relationship between a surface roughness of the flat portion in the diffusion sheet according to the embodiment of the present disclosure and a luminance-decreasing rate in the front direction.

FIG. 10 is an experiment result showing a relationship between a surface roughness (Ra) of the flat portion 13 of the diffusion-sheet main surface 11a and a haze-increasing rate value of the diffusion sheet. FIG. 11 is an experiment result showing a relationship between the surface roughness (Ra) of the flat portion 13 of the diffusion-sheet main surface 11a and a front luminance-decreasing rate of the diffusion sheet. As the measurement samples, three samples different in the filling rate of the structures 12 were used, the three samples being produced using the masters for producing Samples 1 to 3 described above. The haze value-increasing rate (H1) was set to be a difference (H1−H0) from a haze value (H0) of the diffusion sheet produced using each of Samples 1 to 3 not subjected to the blast processing. The front luminance-decreasing rate was set to be a relative ratio with the front luminance of the diffusion sheet being a reference.

As shown in FIGS. 10 and 11, as the filling rate of the structures 12 becomes lower, the entire area of the flat portion 13 increases, and hence the haze-increasing rate increases. Further, as the filling rate of the structures 12 increases, the luminance-decreasing rate increases. It is considered that this is caused by the shape change of the edge portions of the master concave portions for forming the structures 12.

Figure 12:
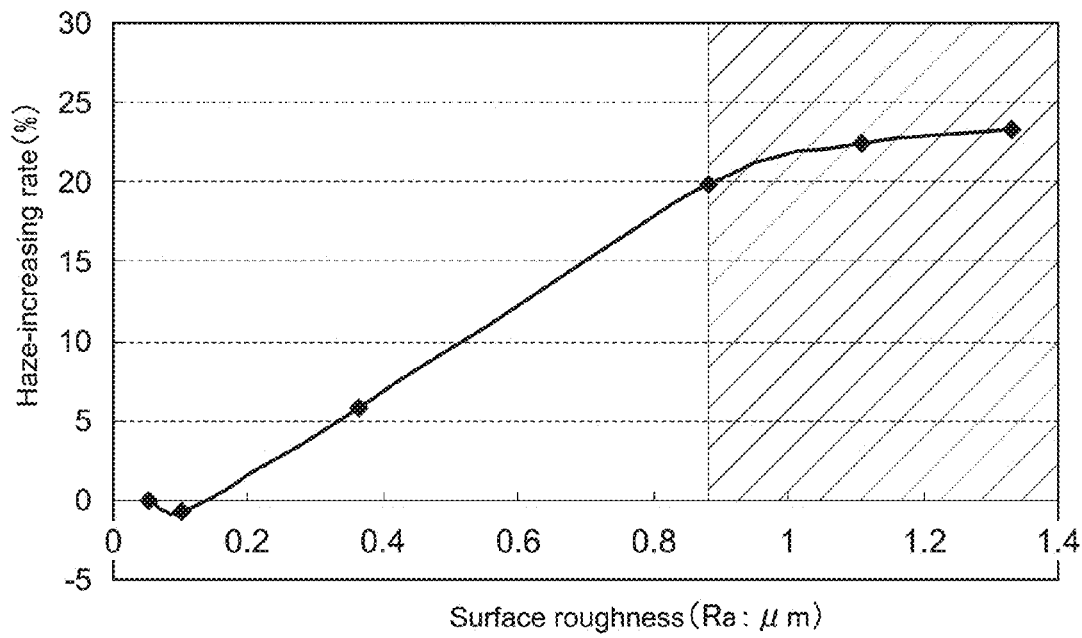
FIG. 12 is an experiment result showing the relationship between a surface roughness of the flat portion in the diffusion sheet according to the embodiment of the present disclosure and the haze-increasing rate.
Figure 13:
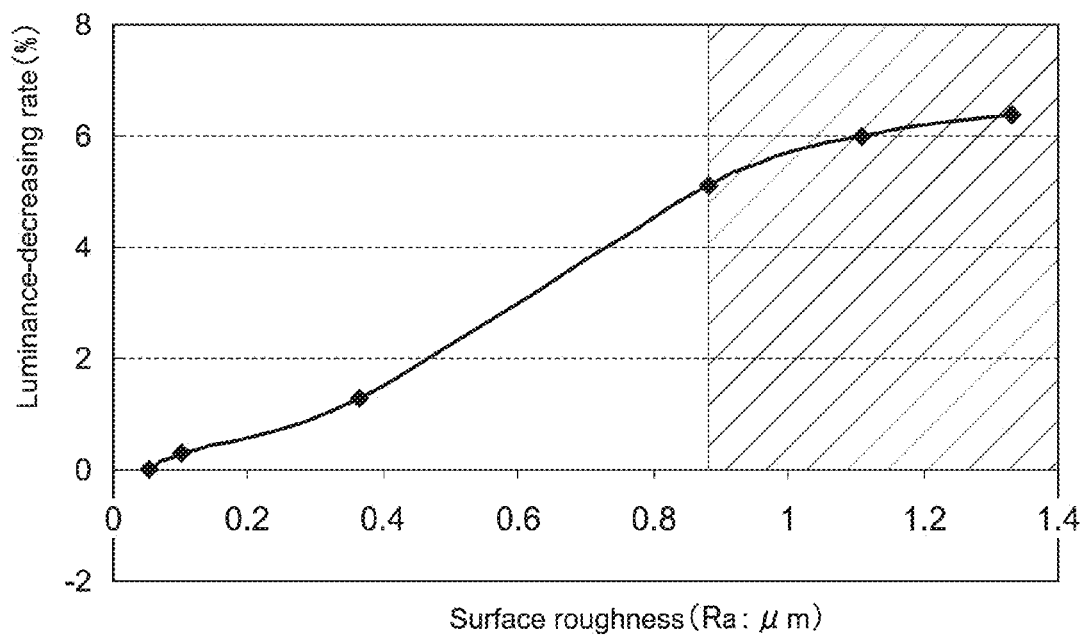
FIG. 13 is an experiment result showing the relationship between a surface roughness of the flat portion in the diffusion sheet according to the embodiment of the present disclosure and the luminance-decreasing rate in the front direction.

FIG. 12 is an experiment result showing a relationship between a surface roughness (Ra) of the flat portion 13 of the diffusion sheet 1 produced using Sample 3 described above and a front luminance-decreasing rate of the diffusion sheet. FIG. 13 is an experiment result showing a relationship between the surface roughness (Ra) of the flat portion 13 of the diffusion sheet 1 produced using Sample 3 described above and a front luminance-decreasing rate of the diffusion sheet. Here, in particular, the relationships in the case where the surface roughness is no less than 0.9 μm are shown.

As shown in FIG. 12, as the surface roughness becomes higher, the haze value increases. However, after reaching a certain value (Ra: 0.9 μm), the haze increasing effect tends to be lowered. It is considered that since the area to be subjected to the blast processing is fixed, the light diffusion effect is saturated at a certain roughness level.

Similarly, as shown in FIG. 13, as the surface roughness becomes higher, the luminance loss increases. However, after reaching a certain value (Ra: 0.9 μm), the tilt of the curve of the luminance loss tends to decrease. It is considered that the shape change of the edge portions of the master concave portions due to the blast processing is saturated after reaching a certain level and, consequently, the luminance losses converge to a certain level.

Figure 14:
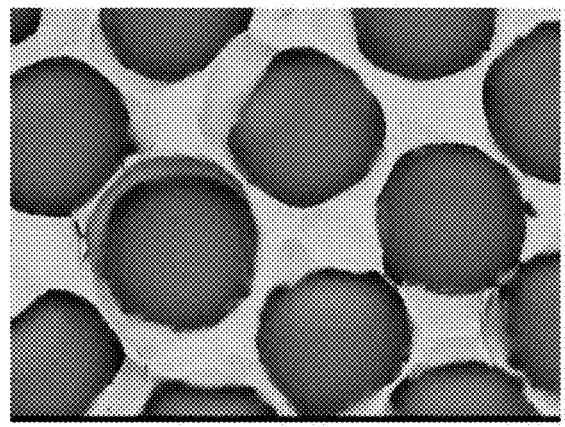
FIG. 14 is an enlarged photograph showing an example of the master for producing the diffusion sheet according to the embodiment of the present disclosure.

FIG. 14 is a photograph of a master subjected to the blast processing using the blasting particles each having a particle diameter of 106 to 125 μm at a discharge pressure of 1 kPa, the photograph being taken by an electronic microscope. It can be seen that the flat portion surrounding the circular structures has a plurality of reticulated cracks or strains. It can also be seen that the shapes of the edge portions of the concave portions of the master for forming the structures 12 are changed due to the blast processing.

Figure 15:
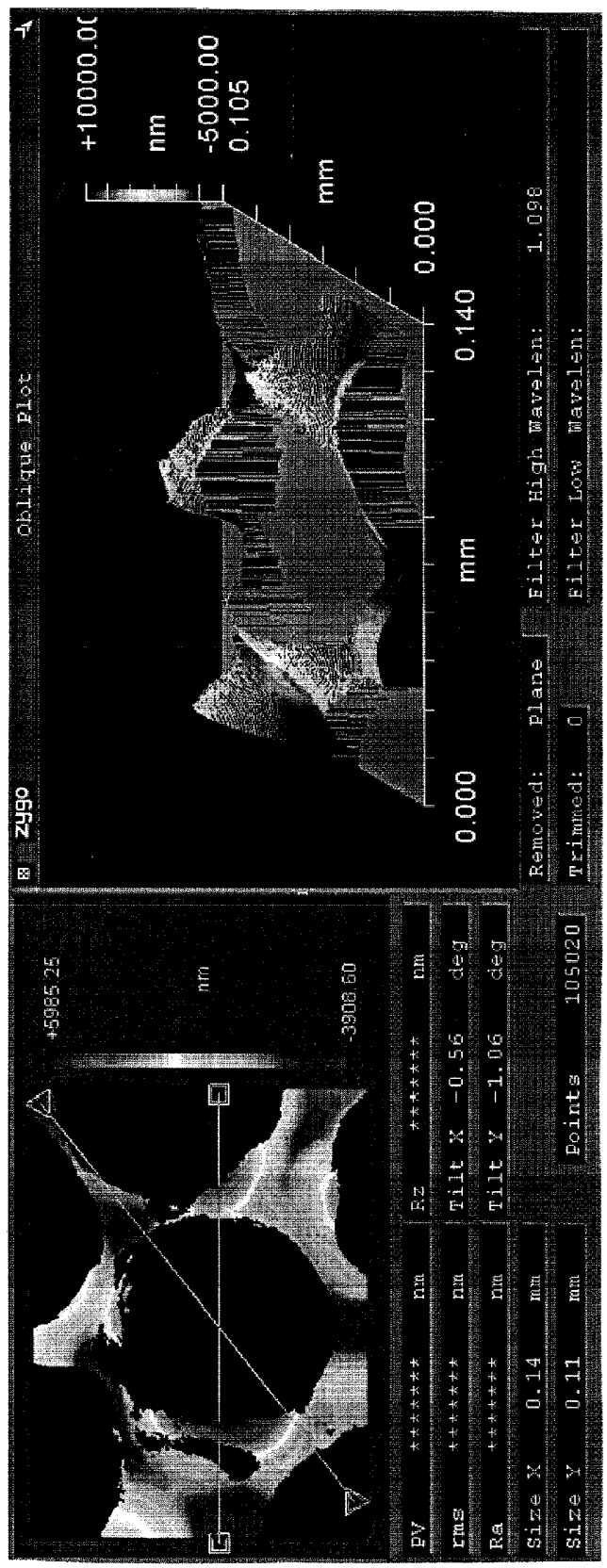
FIG. 15 is a view showing measurement results of the surface roughness of the flat portion of the diffusion sheet produced using the master shown in FIG. 14.

FIG. 15 is measurement data of the surface roughness of the flat portion of the diffusion sheet produced using the master shown in FIG. 14. In the case of this example, the surface roughness (Ra) of the flat portion was 1.3 μm. As a measurement apparatus therefor, a surface roughness measurement instrument "NewView series" produced by Zygo Corporation was used.

As described above, in such a range that the surface roughness (Ra) of the flat portion 13 is no less than 0.9 μm, it is possible to increase the haze value by 20% or more in comparison with the case where the flat portion is not roughened. Accordingly, it is possible to obtain the diffusion sheet having a haze value of no less than 90%.

Such a diffusion sheet is effective for overcoming unevenness in luminescent spot of a light guide plate in a side light type backlight apparatus or unevenness in luminescent spot of a light source in a direct type backlight apparatus. Further, with the single diffusion sheet, a desired high haze is obtained, and hence it becomes unnecessary to use a plurality of laminated diffusion sheets. Therefore, it becomes possible to configure a thin backlight apparatus.

Moreover, in recent years, side light type backlight apparatuses for television in which LEDs are used for the light source have been developed. In the backlight apparatus of this type, there is a fear that a light diffusion dot pattern formed on a light guide plate is visible through a liquid crystal panel. However, by using the diffusion sheet having a haze value of no less than 90%, it is possible to prevent the dot pattern from being visible. The present inventors arranged the diffusion sheet according to this embodiment and a polarization separation element in the stated-order on a surface-emitting light source with LEDs being arranged at intervals of 10 mm at one end of a light guide plate for a 32-inches liquid crystal panel, and evaluated the visibility of the dot pattern of the light guide plate. As a result, it was confirmed that in such a range that the surface roughness (Ra) of the flat portion 13 is no less than 0.9 μm (haze is no less than 90%), the dot pattern became invisible.

On the other hand, also in such a range that the surface roughness (Ra) of the flat portion 13 is no less than 0.9 μm, the luminance loss-increasing rates converge to a certain range and, with a surface roughness (Ra) of no more than 1.33 μm, the luminance-decreasing rate is kept below 7%. Therefore, it is possible to prevent the luminance from being significantly lowered. In particular, in the case where a high-luminance light source such as the LED is used for configuring the backlight apparatus, in comparison with the backlight apparatus using a traditional fluorescent tube (CCFL), it becomes unnecessary to increase the luminance as much as possible. Therefore, it can be said that a slight increase of the luminance loss causes no problem in practice.

(Shape Transfer Process)

Figure 3G:
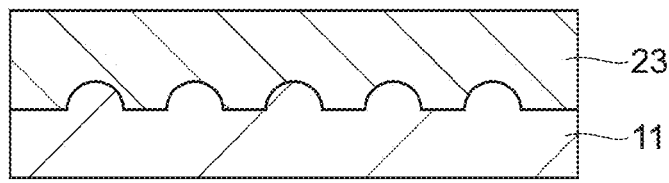

Next, for example, to the molding apparatus such as the melt extrusion molding apparatus or the laminate transfer molding apparatus, the produced master 23 is installed. Next, the shapes of the concave portions 21a and the flat portion 21b of the master 23 are transferred to the single main surface of the substrate 11 (see FIG. 3G).

In this manner, as shown in FIG. 1, the diffusion sheet 1 having the main surface 11a of the substrate 11, on which the plurality of convex-shaped structures 12 and the flat portion 13 among the structures 12, which has a predetermined surface roughness, are formed, is produced.

[Molding Apparatus of Diffusion Sheet]

(First Example of Molding Apparatus)

Figure 4A:
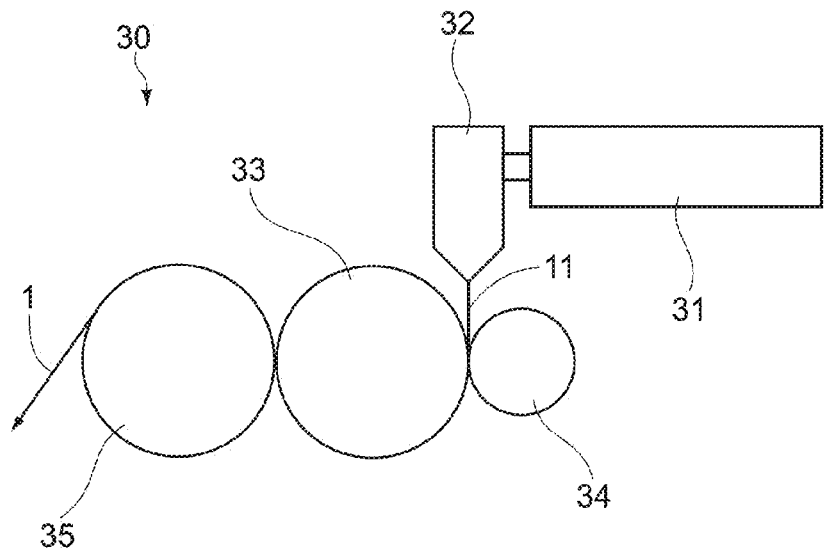
FIG. 4A is a schematic view of a melt extrusion molding apparatus and FIG. 4B is a schematic view of a laminate transfer molding apparatus.

FIG. 4A is a view showing a configuration example of the melt extrusion molding apparatus. As shown in FIG. 4A, this melt extrusion molding apparatus 30 includes an extruder 31, a T-die 32, a molding roll 33, an elastic roll 34, and a cooling roll 35. Here, the molding roll 33 is an example of the above-mentioned master 23.

The extruder 31 melts a resin material supplied from a hopper (not shown in the figure) and supplies the molten resin material to the T-die 32. The T-die 32 is a die having a linear opening and stretches the resin material supplied from the extruder 31 to have a sheet width for molding and discharges it.

The molding roll 33 has a circular cylindrical shape and is configured to be rotatable with its center axis being a rotational axis. Further, the molding roll 33 is configured to be coolable. Specifically, the molding roll 33 includes one or more flow channels through which a cooling medium such as an oil medium flows into the inside of the molding roll 33.

The circular cylindrical surface of the molding roll 33 has a concavo-convex shape for transferring a micro pattern to a sheet discharged from the T-die 32. The concavo-convex shape is, for example, a micro concavo-convex shape for transferring the shapes of the structures 12 to the substrate 11. The concavo-convex shape is favorably formed by the combination of a photolithography process and the etching process as described above. That is because the non-uniformity in height of the structures 12 can be thereby suppressed. The above-mentioned concavo-convex shape includes the concavo-convex-shaped surface of the master 23 described with reference to FIG. 3G.

The elastic roll 34 has a circular cylindrical shape and is configured to be rotatable with its center axis being a rotational axis. Further, the surface of the elastic roll 34 is configured to be elastically deformable. When the sheet is nipped by the molding roll 33 and the elastic roll 34, the surface of the elastic roll 34 that is brought into contact with the molding roll 33 is crushed.

The elastic roll 34 is, for example, covered with a seamless tube formed of NI plating or the like. The elastic roll 34 includes, within the seamless tube, an elastic body for allowing the surface of the elastic roll 34 to be elastically deformable. As long as the surface of the elastic roll 34 is elastically deformable when it is brought into contact with the molding roll 33 at a predetermined pressure, there is not limitation on the configuration and the material of the elastic roll 34. As the material therefor, for example, a rubber material, a metal, or a composite material may be used. Further, the elastic roll 34 is not limited to have a roll shape, one having a belt shape may be used. The elastic roll 34 is configured to be coolable. Specifically, the elastic roll 34 includes one or more flow channels through which a cooling medium such as water flow into the inside of the elastic roll 34.

The surface of the elastic roll 34 may be appropriately roughened. In this case, it is possible to roughen the back surface (main surface 11b) of the diffusion sheet to be produced. The surface roughness (Ra) of the elastic roll 34 is, for example, no more than 0.5 µm.

The cooling roll 35 has a circular cylindrical shape and is configured to be rotatable with its center axis being a rotational axis. The cooling roll 35 is configured to be coolable. Specifically, the cooling roll 35 includes one or more flow channels through which a cooling medium such as water flow into the inside of the cooling roll 35.

Next, an operation of the melt extrusion molding apparatus 30 having the above-mentioned configuration will be described.

First, a resin material is molten by the extruder 31 and sequentially supplied to the T-die 32, and sheets are consecutively discharged from the T-die 32. Next, one of the sheets discharged from the T-die 32 is nipped by the molding roll 33 and the elastic roll 34. Accordingly, the concavo-convex shape of the molding roll 33 is transferred to the resin material. Next, while the substrate 11 is nipped by the molding roll 33 and the cooling roll 35 for suppressing fluttering of the substrate 11, the substrate 11 is separated from the molding roll 33 by the cooling roll 35.

In this manner, the desired diffusion sheet 1 can be obtained.

(Second Example of Molding Apparatus)

Figure 4B:
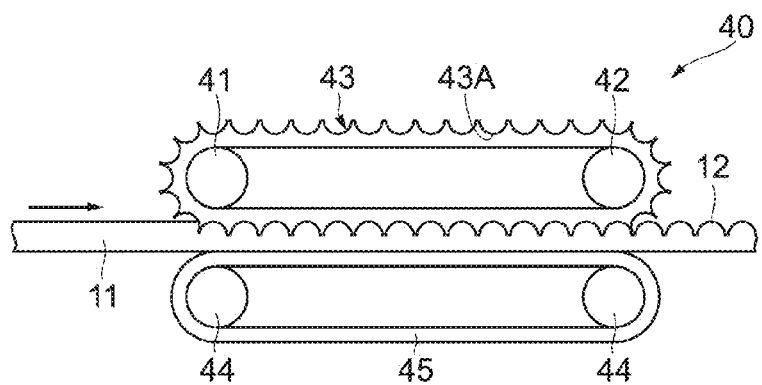

FIG. 4B is a view showing a configuration example of the laminate transfer molding apparatus. This laminate transfer molding apparatus 40 includes an embossed belt 43 and a flat belt 45. The embossed belt 43 is rotated by a heating roll 41 and a cooling roll 42. The flat belt 45 is rotated by two press rolls 44 arranged to be opposed to the heating roll 41 and the cooling roll 42. Further, the substrate 11 before shaping can be inserted between the embossed belt 43 including a plurality of concave portions 43A on its surface and the flat belt 45 having no irregularities. Here, the embossed belt 43 is an example of the above-mentioned master 23.

For the embossed belt 43, the master 23 described above with reference to FIG. 3G may be used. In this case, the concave portions 43A are formed of the concavo-convex-shaped surface including the concave portions 21a and the flat portion 21b of the master 23. Further, by roughening the surface of the flat belt, it is possible to provide the back surface (main surface 11b) of the diffusion sheet to be produced with a suitable surface roughness.

Next, an operation of the laminate transfer molding apparatus 40 having the above-mentioned configuration will be described.

First, the embossed belt 43 and the flat belt 45 are rotated and the substrate 11 before shaping is inserted into a gap between the embossed belt 43 and the flat belt 45 from a side of the heating roll 41. Accordingly, the single main surface of the substrate 11 is molten due to the heat of the heating roll 41 for only a moment and the shapes of the concave portions 43A are transferred to the single main surface of the substrate 11. After that, the surface of the substrate 11, to which the shapes of the concave portions 43A have been transferred, is cooled by the cooling roll 42, so that the shape of the surface is fixed. Thus, the plurality of the structures 12 are formed on the single main surface of the substrate 11.

In this manner, the desired diffusion sheet 1 can be obtained.

With the diffusion sheet 1 according to this embodiment, it is possible to suppress the generation of the moire because the structures 12 are randomly formed on the main surface 11a. Further, the flat portion 13 formed among the structures 12 on the main surface 11a has a surface roughness (Ra) of no less than 0.9 µm, and hence the flat portion 13 has a function of diffusing light transmitting through the flat portion 13. Accordingly, it is possible to suppress a significant decrease in the luminance in the front direction and, at the same time, to enhance the light diffusion function.

According to this embodiment, it is possible to suppress the lowering of the luminance in the front direction and, at the same time, to enhance the light diffusion function, and hence luminance unevenness due to distortion of the diffusion sheet is not readily visible anymore. Therefore, it becomes possible to sufficiently satisfy a demand for reducing the thickness of diffusion sheet 1.

In addition, by adjusting the surface roughness of the main surface 11b and the flat portion 13, it becomes possible to prevent the generation of the moire even if the filling rate of the structures 12 is set to no less than 80%.

Second Embodiment

Configuration of Liquid Crystal Display Apparatus

First Configuration Example

Figure 5A:
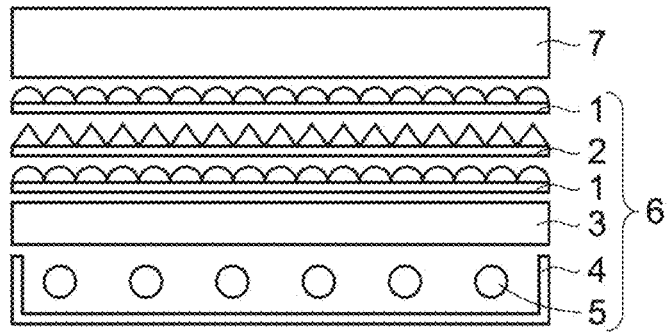
FIG. 5A is a first configuration example.

FIG. 5A is a view showing a first configuration example of a liquid crystal display apparatus according to a second embodiment of the present disclosure. As shown in FIG. 5A, this liquid crystal display apparatus includes a backlight 6 that emits light and a liquid crystal panel 7. The liquid crystal panel 7 modifies the light emitted from the backlight 6 in terms of time and space and displays an image.

Hereinafter, the backlight 6 and the liquid crystal panel 7 that constitute the liquid crystal display apparatus will be described one by one.

(Backlight)

As the backlight 6, for example, a direct type backlight, an edge type backlight, or a planer light source type backlight may be used. It should be noted that FIG. 5A illustrates a case where the backlight 6 is the direct type backlight. The backlight 6 includes, for example, a reflection sheet 4, a light source 5, a diffusion plate 3, two diffusion sheets 1, and a lens sheet 2. The reflection sheet 4 is provided on a side of the back surface being an opposite side to the display surface of the liquid crystal display apparatus. Between the light source 5 and the liquid crystal panel 7, the diffusion plate 3, the diffusion sheet 1, the lens sheet 2, and the diffusion sheet 1 are arranged in the stated order from the light source 5 to the liquid crystal panel 7.

As the light source 5, for example, a cold cathode fluorescent lamp (CCFL), a hot cathode fluorescent lamp (HCFL), an organic electro luminescence (OEL), an inorganic electro luminescence (IEL), or a light emitting diode (LED) is used.

The reflection sheet 4 functions to enhance a light use efficiency by, for example, diffusing or reflecting the light emitted from the light source 5. As the reflection sheet 4, for example, a diffuse reflection-based (white) reflection sheet or a specular reflection-based reflection sheet may be used. As the diffuse reflection-based reflection sheet 4, for example, a white polyester film or an interface multiple reflection sheet (e.g., ultra-white polyester film) may be used. As the specular reflection-based reflection sheet 4, for example, a metal thin film such as a silver thin film may be used.

The lens sheet 2 serves to collect diffused light from the light source 5 to increase the luminance. As the lens sheet 2, for example, a prism sheet having a sharp prism apex, a prism sheet with a rounded prism apex, a prism sheet having a single main surface in which a random prism pattern is formed, an optical sheet (web sheet) having a single main surface in which a uniform web pattern is formed, or the like may be used.

As the diffusion sheet 1, the diffusion sheet according to the first embodiment of the present disclosure is used. The diffusion sheet 1 is provided with the one main surface 11a facing the liquid crystal panel 7 and the other main surface 11b facing the light source 5.

(Liquid Crystal Panel)

As the liquid crystal panel 7, for example, a liquid crystal panel in a display mode such as a twisted nematic (TN) mode, a super twisted nematic (STN) mode, a vertically aligned (VA) mode, an in-plane switching (IPS) mode, an optically compensated birefringence (OCB) mode, a ferroelectric liquid crystal (FLC) mode, a polymer dispersed liquid crystal (PDLC) mode, or a phase change guest host (PCGH) mode may be used.

Further, by further providing the backlight 6 with a reflection type polarizer (not shown), it becomes possible to efficiently use light emitted from the light source 5. Thus, it is possible to increase the luminance of the liquid crystal display apparatus and to decrease power consumption. The reflection type polarizer is provided on a side of the liquid crystal panel to be adjacent to the liquid crystal panel 7. The reflection type polarizer causes only one of polarization components orthogonal to each other to transmit therethrough and reflects the other. As the reflection type polarizer, for example, a laminated body such as an organic multi-layer film, an inorganic multi-layer film, or a liquid crystal multi-layer film may be used.

Second Configuration Example

Figure 5B:
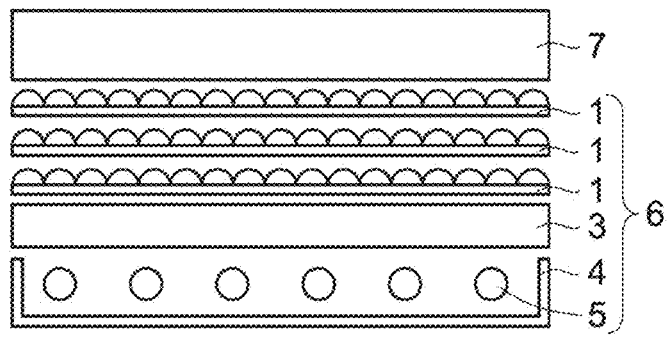
FIG. 5B is a second configuration example.

FIG. 5B is a view showing a second configuration example of the liquid crystal display apparatus according to the second embodiment of the present disclosure. As shown in FIG. 5B, a backlight 6 includes a diffusion plate 3 and three diffusion sheets 1. The diffusion plate 3 and the three diffusion sheets 1 are arranged in the stated order from a light source 5 to a liquid crystal panel 7.

In the second configuration example, other points are the same as in the first configuration example.

Third Configuration Example

Figure 5C:
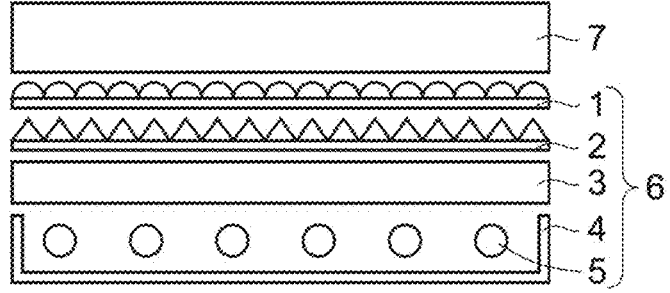
FIG. 5C is a third configuration example.

FIG. 5C is a view showing a third configuration example of the liquid crystal display apparatus according to the second embodiment of the present disclosure. As shown in FIG. 5C, a backlight 6 includes a diffusion plate 3, a lens sheet 2, and a diffusion sheet 1. The diffusion plate 3, the lens sheet 2, and the diffusion sheet 1 are arranged in the stated order from a light source 5 to a liquid crystal panel 7.

In this third configuration example, other points are the same as in the first configuration example.

According to this embodiment, the backlight 6 includes the diffusion sheet 1 according to the first embodiment of the present disclosure, and hence it is possible to effectively improve the luminance unevenness of the light source 5 and, at the same time, to increase the luminance of the liquid crystal display apparatus. Further, it is also possible to replace the lens sheet 2 by the diffusion sheet 1.

Hereinabove, although the embodiments of the present disclosure have been described, the present disclosure is not limited thereto and various modifications can be made based on the technical concept of the present disclosure.

Figure 16A:
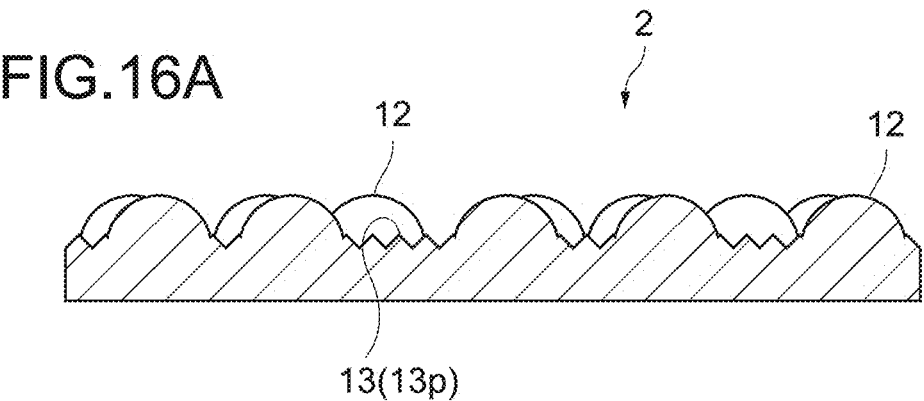
FIG. 16A is a cross-sectional view of main parts schematically showing a modified example of the diffusion sheet according to the embodiment of the present disclosure and FIG. 16B is a perspective view thereof.
Figure 16B:
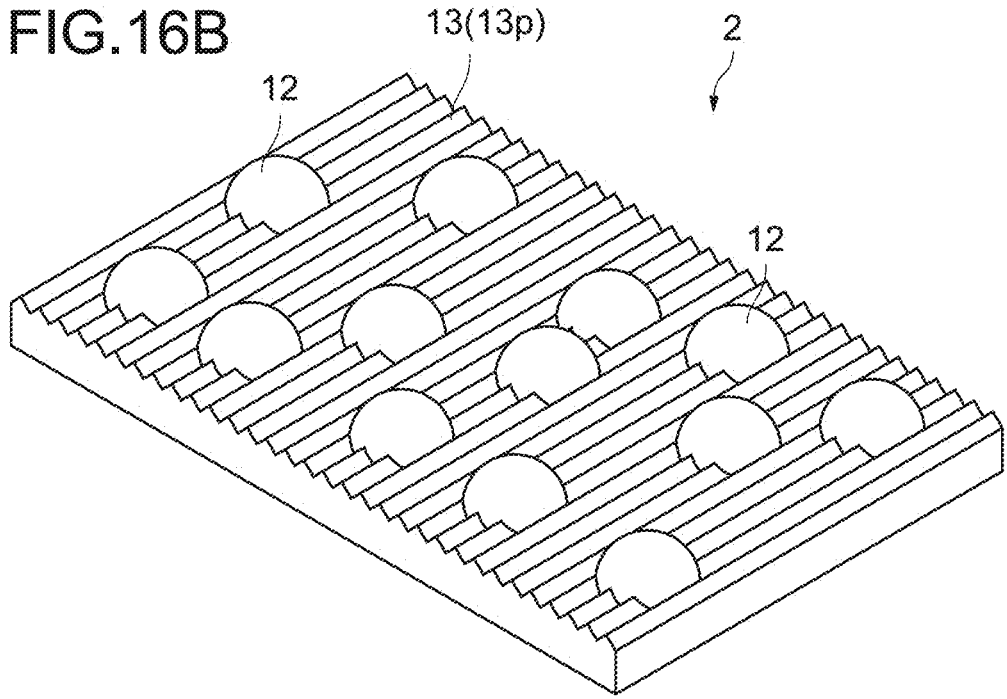

For example, in the above-mentioned embodiments, the blast processing is used for the roughening processing of the master for producing a diffusion sheet. However, alternatively, various surface processing methods such as wire brushing, laser machining, and grinding processing may be used for the roughening processing of the master. Irrespective of the processing method, the flat portion 13 is defined by its surface roughness (Ra). The processed shape is not particularly limited and may be any shape such as a spherical shape, a prism shape, or a grid shape. For example, FIGS. 16A and 16B are a cross-sectional side view and a perspective view of main parts each schematically showing a diffusion sheet 2 having a surface of a flat portion 13 on which prisms 13p each having an almost-triangular cross-section are formed. By forming the flat portion 13 in the prism form, it is possible to obtain a light diffusion effect of the flat portion. Further, in this case, the surface roughness of the flat portion 13 varies in a ridge direction and an arrangement direction of the prisms 13p. However, it is sufficient that the flat portion 13 in at least one of the two directions has a surface roughness (Ra) of no less than 0.9 µm.

Figure 17:
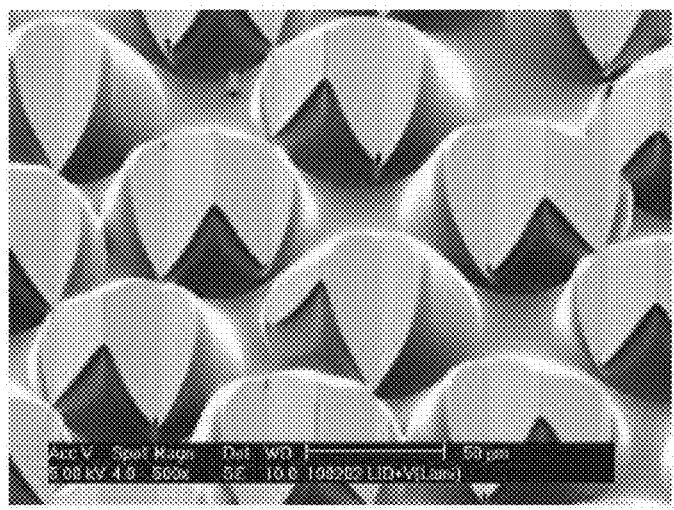
FIG. 17 is a photograph taken by an electronic microscope, which shows a modified example of the diffusion sheet according to the embodiment of the present disclosure.

It is possible to appropriately set the surface roughness (Ra) of the structures 12 in view of a relationship between a desired haze value and an allowed luminance loss, for example, to no more than 3.5 µm. Further, the structures 12 are not limited to those each having the partially spherical shape. For example, FIG. 17 shows an example in which the structures each having the partially spherical shape were formed before minute groove shapes were added to the surfaces of the structures. Accordingly, it is possible to form the structures having a light diffusion effect of the spherical portions and a light collection function of the groove portions.

The method of molding a diffusion sheet is not limited to the methods using the melt extrusion molding apparatus and the laminate transfer molding apparatus described above. For example, other molding apparatuses such as a thermal press apparatus may be used.

Further, the configurations, methods, shapes, materials, numerical values, and the like that have been described in the above embodiments are merely examples, and different configurations, methods, shapes, materials, numerical values, and the like may be used if necessary.

It should be noted that the present disclosure may also take the following configurations.

(1) A diffusion sheet, including:
a light-transmissive substrate including
a first main surface, and
a second main surface;
a plurality of convex-shaped structures randomly formed on the first main surface; and
a flat portion that is formed among the plurality of structures on the first main surface and has a surface roughness (Ra) of no less than 0.9 µm.

(2) The diffusion sheet according to Item (1), in which
the second main surface has a surface roughness (Ra) of no more than 0.5 µm.

(3) The diffusion sheet according to Item (1) or (2), in which
each of the plurality of structures has a partially spherical shape.

(4) The diffusion sheet according to any one of Items (1) to (3), in which
the plurality of structures have a filling rate of no less than 60% and no more than 80% in the first main surface.

(5) A backlight, including:
a diffusion sheet including
a light-transmissive substrate including
a first main surface, and
a second main surface,
a plurality of convex-shaped structures randomly formed on the first main surface, and
a flat portion that is formed among the plurality of structures on the first main surface and has a surface roughness (Ra) of no less than 0.9 µm; and
a light source provided on a side of the second main surface.

(6) A liquid crystal display apparatus, including:
a diffusion sheet including
a light-transmissive substrate including
a first main surface, and
a second main surface,
a plurality of convex-shaped structures randomly formed on the first main surface, and
a flat portion that is formed among the plurality of structures on the first main surface and has a surface roughness (Ra) of no less than 0.9 µm; a light source provided on a side of the second main surface; and
a liquid crystal panel provided on a side of the first main surface.

(7) A method of producing a diffusion sheet, including:
forming random exposure patterns in a resist layer formed on a surface of a substrate for producing a master;
developing the resist layer in which the random exposure patterns are formed, to thereby form random pattern openings in the resist layer;
etching the substrate for producing a master using the resist layer in which the openings are formed as a mask, to thereby produce a master including concave portions formed correspondingly to the openings and a flat portion covered with the resist layer;
roughening the flat portion to have a surface roughness (Ra) of no less than 0.9 µm; and
transferring shapes of the concave portions and the roughened flat portion of the master to a main surface of a light-transmissive substrate, to thereby produce a diffusion sheet including a plurality of convex-shaped structures and a roughened flat portion among the plurality of structures.

(8) The method of producing a diffusion sheet, according to Item (7), in which
in the roughening the flat portion of the master, blast processing in which blasting particles are spayed onto the flat portion is used.

(9) The method of producing a diffusion sheet, according to Item (8), in which
in the blast processing, blasting particles each having a particle diameter larger than an opening diameter of each of the concave portions are used.

(10) The method of producing a diffusion sheet, according to any one of Items (7) to (9), further including:
chromium-plating, after the concave portions are formed before the flat portion is roughened, the concave portions and the flat portion.

The present disclosure contains subject matter related to that disclosed in Japanese Priority Patent Application JP 2011-172722 filed in the Japan Patent Office on Aug. 8, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A diffusion sheet, comprising:
a light-transmissive substrate including:

a first main surface;
a second main surface;
a plurality of convex-shaped structures randomly formed on the first main surface; and
a portion where prisms are formed among the plurality of convex-shaped structures on the first main surface,
wherein the portion has a surface roughness (Ra) of no less than 0.9 μm and wherein a side-surface angle of each of the plurality of convex-shaped structures with the first main surface is no less than 65 degrees and no more than 90 degrees.

2. The diffusion sheet according to claim 1, wherein the second main surface has a surface roughness (Ra) of no more than 0.5 μm.

3. The diffusion sheet according to claim 1, wherein each of the plurality of convex-shaped structures has a partially spherical shape.

4. The diffusion sheet according to claim 1, wherein the plurality of convex-shaped structures have a filling rate of no less than 60% and no more than 80% in the first main surface.

5. A backlight, comprising:
a diffusion sheet including:
    a light-transmissive substrate including:
        a first main surface;
        a second main surface;
        a plurality of convex-shaped structures randomly formed on the first main surface;
        a portion where prisms are formed among the plurality of convex-shaped structures on the first main surface, wherein the portion has a surface roughness (Ra) of no less than 0.9 μm, and wherein a side-surface angle of each of the plurality of convex-shaped structures with the first main surface is no less than 65 degrees and no more than 90 degrees; and
a light source provided on a side of the second main surface.

6. A liquid crystal display apparatus, comprising:
a diffusion sheet including:
    a light-transmissive substrate including:
        a first main surface,
        a second main surface,
        a plurality of convex-shaped structures randomly formed on the first main surface;
        a portion where prisms are formed among the plurality of convex-shaped structures on the first main surface, where the portion has a surface roughness (Ra) of no less than 0.9 μm, and wherein a side-surface angle of each of the plurality of convex-shaped structures with the first main surface is no less than 65 degrees and no more than 90 degrees;
a light source provided on a side of the second main surface; and
a liquid crystal panel provided on a side of the first main surface.

* * * * *